(12) United States Patent
Hagiwara et al.

(10) Patent No.: US 10,949,614 B2
(45) Date of Patent: Mar. 16, 2021

(54) DYNAMICALLY CHANGING WORDS BASED ON A DISTANCE BETWEEN A FIRST AREA AND A SECOND AREA

(71) Applicant: INTERNATIONAL BUSINESS MACHINES CORPORATION, Armonk, NY (US)

(72) Inventors: Katsuhiko Hagiwara, Chuorinkan (JP); Yoshio Horiuchi, Hiratsuka (JP); Chiaki Oishi, Yokohama (JP); Junichi Sugimoto, Yokohama (JP); Yuji Sugiyama, Tokyo (JP); Jiayun Zhu, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 15/703,128

(22) Filed: Sep. 13, 2017

(65) Prior Publication Data
US 2019/0079923 A1 Mar. 14, 2019

(51) Int. Cl.
*G06F 16/00* (2019.01)
*G06F 40/30* (2020.01)
(Continued)

(52) U.S. Cl.
CPC .......... *G06F 40/30* (2020.01); *G06F 16/3344* (2019.01); *G06F 40/274* (2020.01);
(Continued)

(58) Field of Classification Search
CPC ...... G06F 3/0484; G06F 40/30; G06F 40/274; G06F 40/253; G06F 40/56;
(Continued)

(56) References Cited

U.S. PATENT DOCUMENTS

| 6,035,269 A * | 3/2000 | Kim ...................... G06F 17/273 |
| | | 704/2 |
| 7,797,643 B1 * | 9/2010 | Jobs ...................... G06F 3/0481 |
| | | 715/220 |

(Continued)

FOREIGN PATENT DOCUMENTS

| CN | 106415527 A | 2/2017 |
| WO | 2019053572 A1 | 3/2019 |

OTHER PUBLICATIONS

KahindoTech, youtube video, Jun. 4, 2017 https://www.youtube.com/watch?v=o2sgyOAWjtM.*

(Continued)

*Primary Examiner* — Cesar B Paula
*Assistant Examiner* — Benjamin J Norris
(74) *Attorney, Agent, or Firm* — Michael A. Petrocelli

(57) ABSTRACT

A computer-implemented method includes setting a first region on a display, the first region including a first character string, setting a second region, the second region including the first region, and dynamically generating a second character string in response to a user specifying an arbitrary position outside the first region and within the second region, the second character string is generated by changing a representation of the first character string depending on a distance between the first region and the user specified position.

20 Claims, 10 Drawing Sheets

(51) Int. Cl.
*G06F 16/33* (2019.01)
*G06F 40/274* (2020.01)
*G06F 3/0484* (2013.01)
*G06F 3/0487* (2013.01)
*G06F 40/56* (2020.01)
*G06F 40/253* (2020.01)

(52) U.S. Cl.
CPC ........ *G06F 3/0487* (2013.01); *G06F 3/04842* (2013.01); *G06F 40/253* (2020.01); *G06F 40/56* (2020.01)

(58) Field of Classification Search
CPC .............. G06F 3/04842; G06F 3/0487; G06F 17/2785; G06F 16/3344; G06F 17/276; G06F 17/274; G06F 17/2881
See application file for complete search history.

(56) References Cited

U.S. PATENT DOCUMENTS

| | | | |
|---|---|---|---|
| 9,189,077 B2 | 11/2015 | Mori et al. | |
| 9,524,036 B1* | 12/2016 | Cassidy | G06F 3/0346 |
| 2008/0244446 A1* | 10/2008 | LeFevre | G06F 3/0236 |
| | | | 715/810 |
| 2009/0073136 A1 | 3/2009 | Choi | |
| 2015/0350118 A1 | 12/2015 | Yang | |
| 2016/0103812 A1 | 4/2016 | Badger et al. | |
| 2016/0224540 A1* | 8/2016 | Stewart | G06F 17/273 |
| 2016/0359771 A1 | 12/2016 | Sridhar | |
| 2017/0318021 A1* | 11/2017 | Chaudhry | H04L 63/102 |
| 2018/0101524 A1* | 4/2018 | Dunnihoo | G06F 3/04847 |

OTHER PUBLICATIONS

Stack Overflow, "JavaScript multiple keys pressed at once", http://stackoverflow.com/questions/5203407/javascript-multiple-keys-pressed-at-once, Accessed on Jan. 31, 2017, 8 pages.

International Search Report and Written Opinion, International Application No. PCT/IB2018/056839, International filed Sep. 7, 2018, 9 pages.

* cited by examiner

| CLASS 1 | LEVEL | REPRESENTATION |
|---|---|---|
| AGGRESSIVE | 1 | Yes |
| | 2 | Sure |
| | 3 | Good idea! |
| | 4 | Sounds good! |
| | 5 | Of course! |
| | 6 | Definitely! |
| | 7 | Why not? |

*FIG. 3*

| CLASS 7 | LEVEL | REPRESENTATION |
|---|---|---|
| POLITENESS | 1 | Please ·· |
| | 2 | Will you ·· ? |
| | 3 | Can you ·· ? |
| | 4 | Would you ·· ? |
| | 5 | Could you ·· ? |
| | 6 | I wonder if you ·· |
| | 7 | I was wondering if you could ·· |

*FIG. 4*

| # | CLASS |
|---|---|
| 1 | AGGRESSIVE |
| 2 | NEGATIVE |
| 3 | DETAILED |
| 4 | ABSTRACT |
| 5 | STRENGTH |
| 6 | WEAKNESS |
| 7 | POLITENESS |

*FIG. 5*

DYNAMICALLY CHANGING WORDS BASED ON A DISTANCE BETWEEN A FIRST AREA AND A SECOND AREA

BACKGROUND

The present invention generally relates to generation of character strings techniques, and more particularly, to a method, system and computer program product for dynamic generation of character strings.

Character strings are generally inputted to a computer by means of a keyboard or by selecting, using a pointing device, a desired character from a plurality of characters displayed on a screen.

SUMMARY

According to an embodiment of the present disclosure, a computer-implemented method is provided. The method includes setting a first region including the first character string on a display. The method also includes setting a second region including the first region on the display. The method further includes dynamically generating a second character string in response to a user specifying an arbitrary position outside the first region and within the second region, the second character string is generated by changing a representation of the first character string depending on a positional relationship between the first region and the user specified position.

According to another embodiment of the present disclosure, a computer-implemented method is provided. The method includes setting a first region including the first character string on a display. The method also includes setting a second region including the first region on the display. The method further includes dynamically generating a second character string in response to a user specifying an arbitrary position outside the first region and within the second region, the second character string is generated by changing the representation of the first character string, depending on the positional relationship between the first region and the user specified position. The method further includes based on the first character string being composed of two words whose level of representation can be changed, changing the representation for each word and combining to generate a second character string.

According to another embodiment of the present disclosure, a computer readable storage medium having instructions embodied therewith, the instructions executable by a processor or programmable circuitry to cause the processor or programmable circuitry to perform operations is provided. The instructions include setting a first region including the first character string on a display. The method also includes setting a second region including the first region on the display. The method further includes dynamically generating a second character string in response to a user specifying an arbitrary position outside the first region and within the second region, the second character string is generated by changing a representation of the first character string depending on a positional relationship between the first region and the user specified position.

According to another embodiment of the present disclosure, a computer program product including a computer readable storage medium having program instructions embodied therewith, the program instructions executable by a computer to cause the computer to perform the method is provided. The method includes setting a first region including the first character string on a display. The method also includes setting a second region including the first region on the display. The method further includes dynamically generating a second character string in response to a user specifying an arbitrary position outside the first region and within the second region, the second character string is generated by changing the representation of the first character string depending on a positional relationship between first region and the user specified position.

According to another embodiment, an apparatus is provided. The apparatus includes setting a first region including the first character string on a display. The apparatus also includes setting a second region including the first region on the display. The apparatus further includes dynamically generating a second character string in response to a user specifying an arbitrary position outside the first region and within the second region, wherein the second character string is generated by changing the representation of the first character string depending on a positional relationship between the first region and the user specified position.

BRIEF DESCRIPTION OF THE DRAWINGS

The following detailed description, given by way of example and not intended to limit the invention solely thereto, will best be appreciated in conjunction with the accompanying drawings, in which:

FIGS. 3-4 show an example of a representation table, according to an embodiment of the present disclosure.

FIG. 5 shows an example of a class table, according to an embodiment of the present disclosure.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Typical character string input methods may require a longer time to input or correct characters. This is particularly noticeable in instant chats or mail transmissions. Embodiments of the present disclosure may, among other potential benefits, provide a character string generation method, system and computer program product for completing character string input in a substantially quick and efficient manner.

Figure 1:
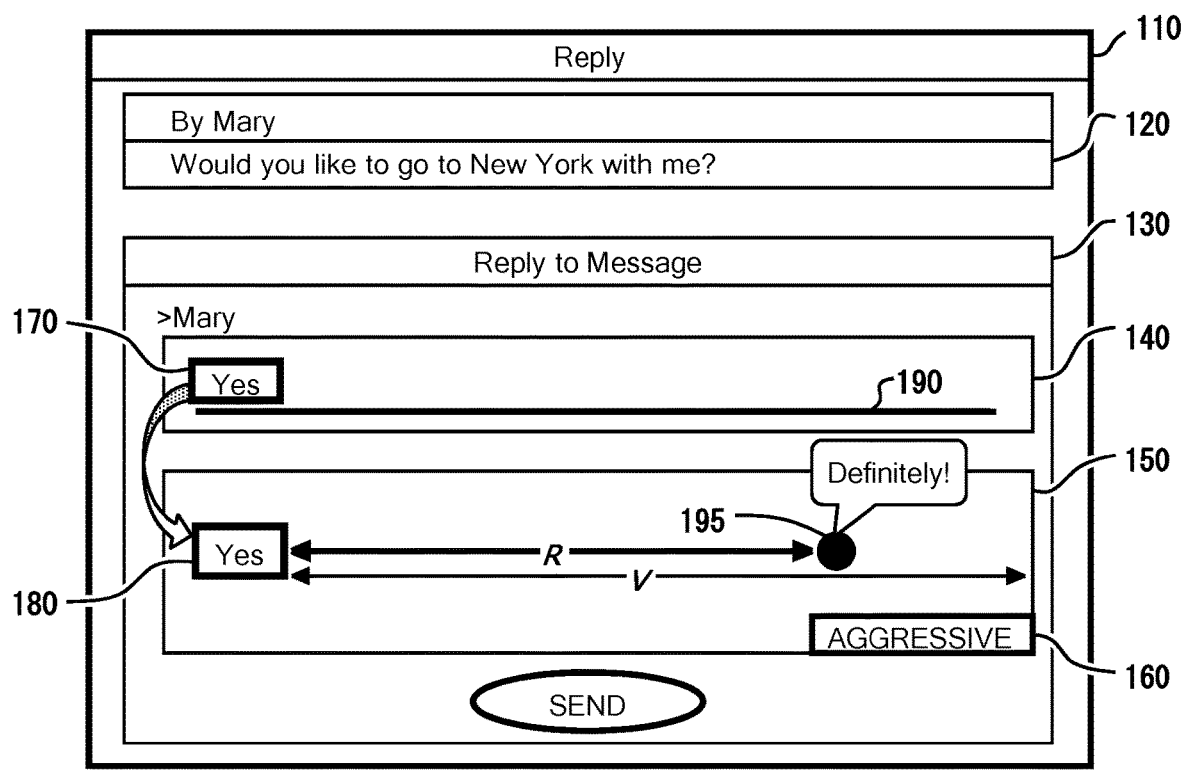
FIGS. 1-2 illustrate a first example of character string generation, according to an embodiment of the present disclosure.

Referring now to FIG. 1, an example of character string generation is shown, according to an embodiment of the present disclosure. In this embodiment, the proposed method for character string generation is described using a mail application, installed in a device, for inputting a character string on a touch panel. However, the present invention may be applied to any application having a function for inputting a character string, such as, for example, a chat application.

Figure 13:
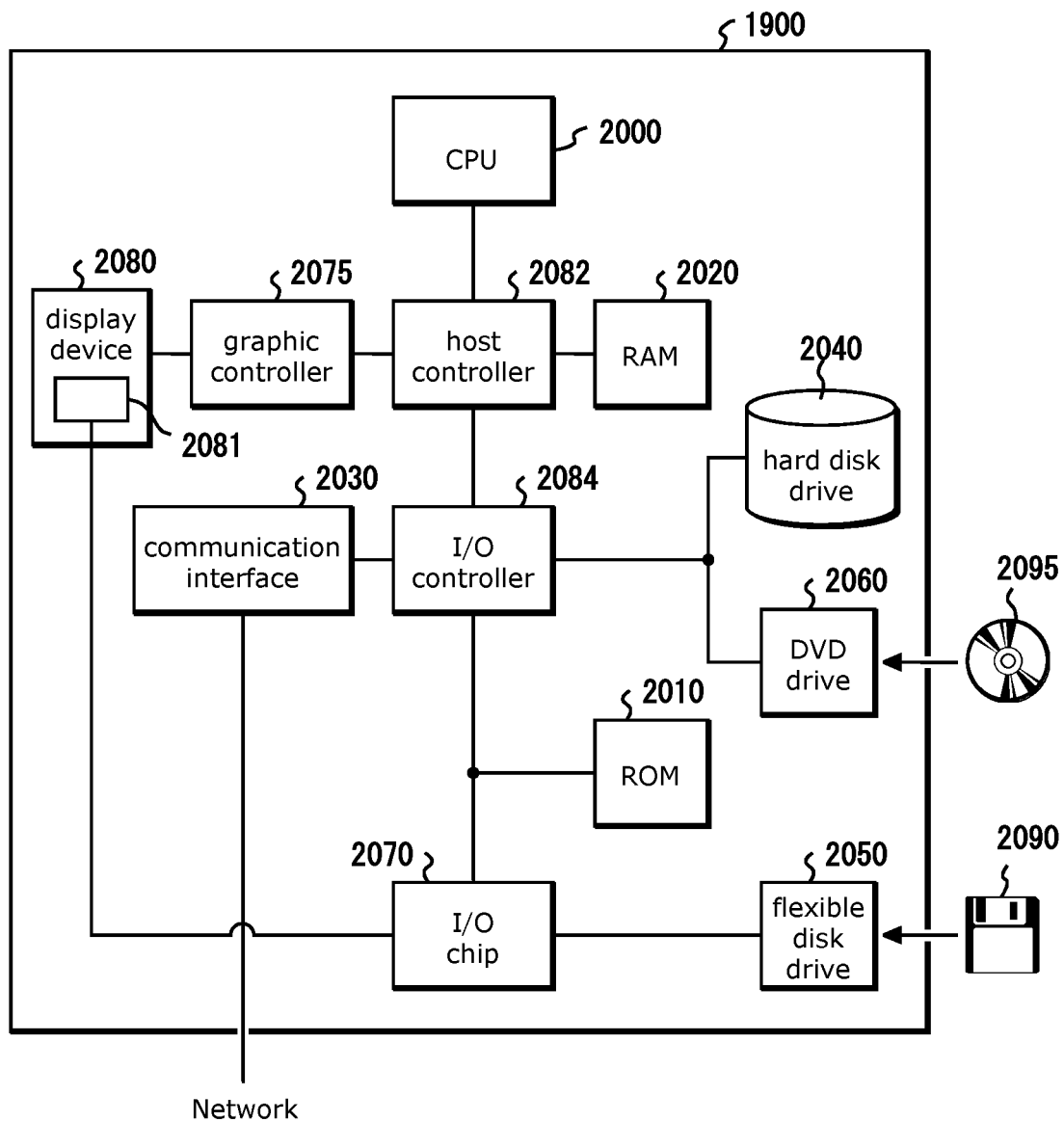
FIG. 13 illustrates an example of a hardware configuration for a computer, according to an embodiment of the present disclosure.

With continued reference to FIG. 1, a window 110 may include a reply window displayed by a mail application operating on the computer 1900 of FIG. 13. In a preferred embodiment, it is assumed that the window 110 is displayed on the touch panel of the computer 1900. A message from Mary is displayed on the window 120. The window 130 is for inputting a reply message. The window 130 consists of two windows: window 140 and window 150. The window 140 is where a final reply message is confirmed and displayed. In the window 140, there is a character string input field 190 (hereinafter "input field"), in which a reply character string 170 is entered.

It should be noted that the reply character string 170 is typically inputted by the user, but it may be displayed by system's default as a simple reply response character string for the question. The window 150 allows flexibly generating and changing character strings. The window 150 is mainly composed of two regions. The first region includes an area for displaying an initial character string 180. The initial character string 180 displays the reply character string 170 as it is.

In FIG. 1, the rectangular area surrounding "Yes" is the first region. The second region includes an area excluding the area outside the first region in the window 150. The outer edge of the second region is the outer frame of the window 150.

Moreover, the window 150 has a selection box representing the derivation indicator 160 of the generated character string. Derivation indicator 160 is an indicator that shows how to change character string by concept.

Figure 12:
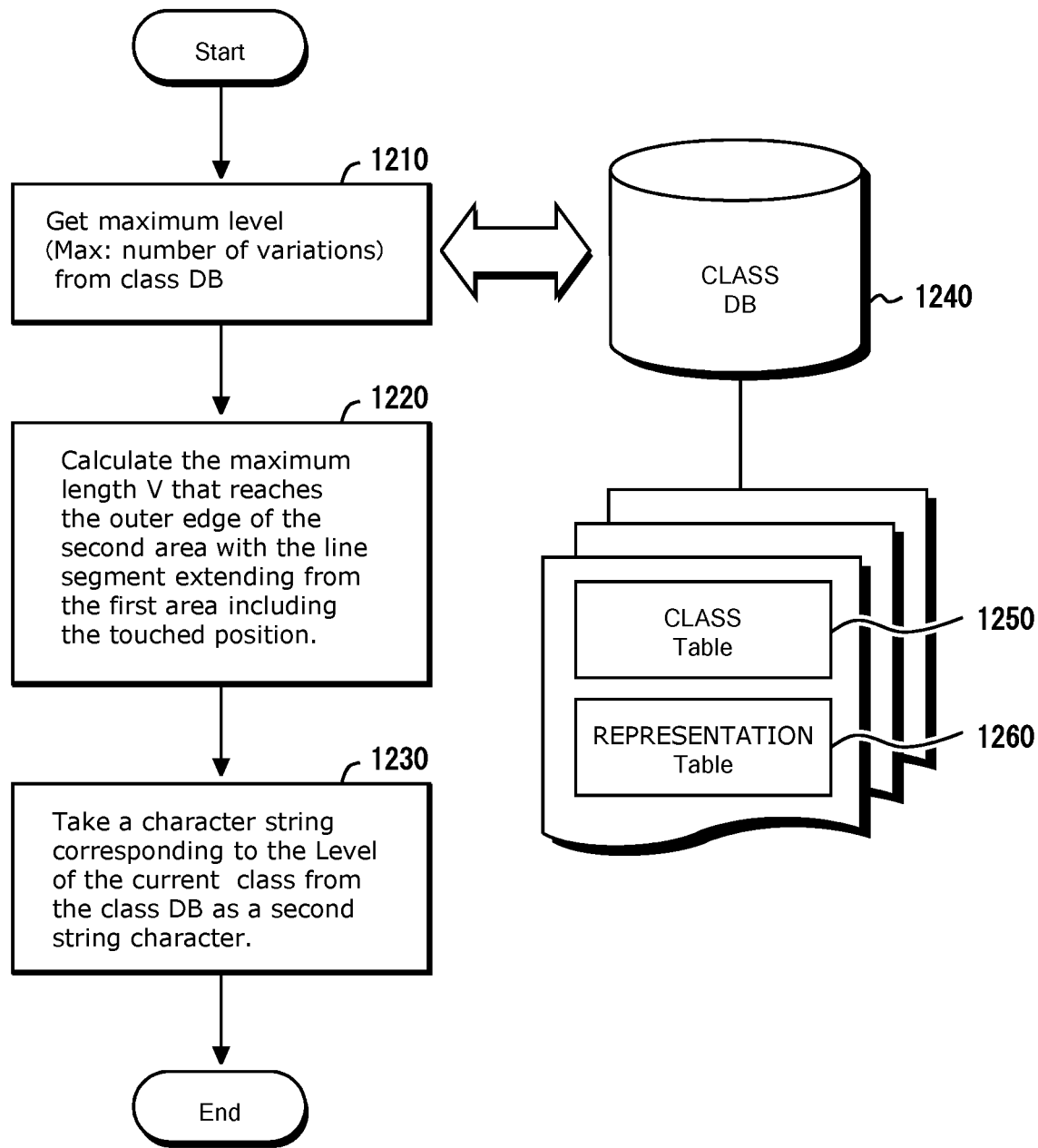
FIG. 12 shows a detailed operation flowchart of the calculation process for generating character strings, according to an embodiment of the present disclosure.

The derivation indicator 160 is preferably displayed automatically when a modification example of the representation of the initial character string 180 exists in the class DB 1240 of FIG. 12. If there are two or more derivation indicators, a derivation indicator may be selected by pressing a selection box.

Generally, in case of replying with an immediate response, simple and direct character string such as "yes" or "no" may be inputted. Therefore, by providing a special user interface, it may be possible to quickly generate a character string expressing the user's fine nuance.

When the user specifies an arbitrary point 195 in the window 150, a character string obtained by transforming the initial character string 180 with the specified derivation indicators is displayed near the arbitrary point 195 according to the distance between the point and the first region. In a preferred embodiment, when it is determined that a character string that may be derived in the input field 190 exists, the window 150 is automatically created.

Figure 2:
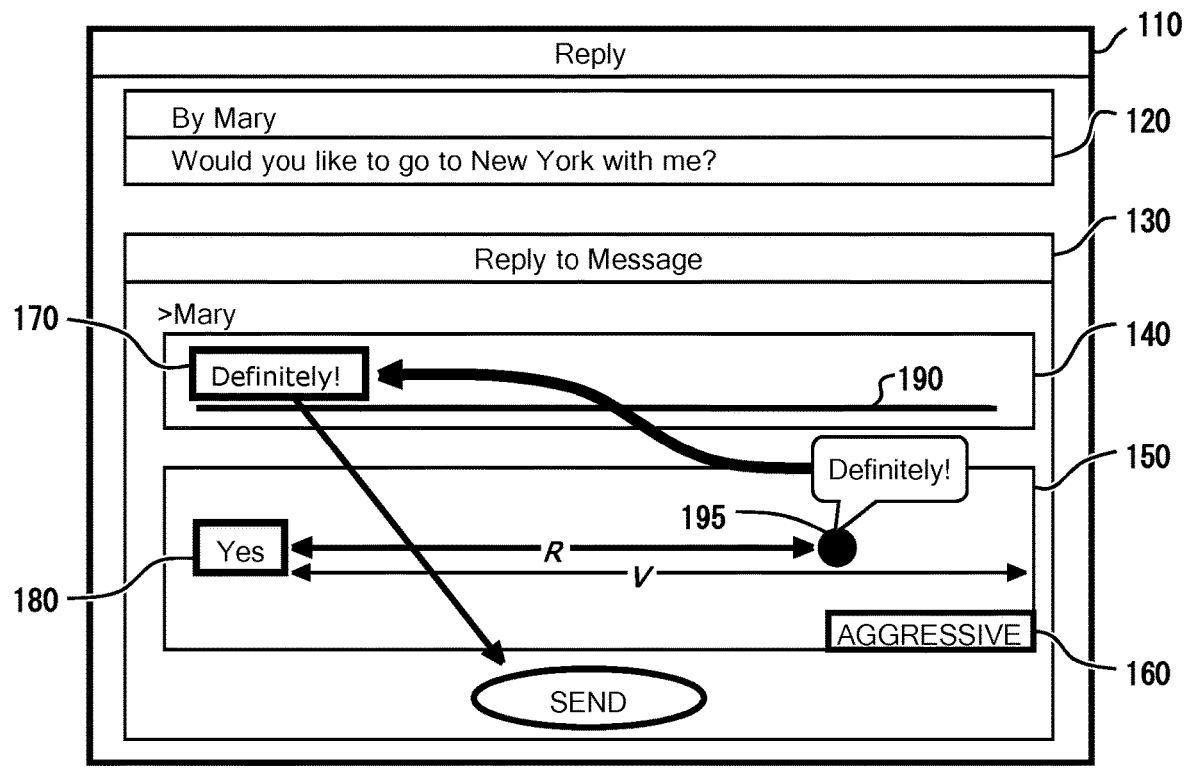

Referring now to FIG. 2, an example of a final reply message is shown, according to an embodiment of the present disclosure. When the user releases his/her finger from the touch panel at the arbitrary point 195, the character string "Definitely!" is fixed. The confirmed character string is displayed as a final reply message similar to the reply character string 170. When the user presses the SEND button, the reply to Mary is completed. It should be noted that, prior to releasing the hand, the user may change to another representation by sliding the finger.

Referring now to FIGS. 3 and 4 examples of the representation table 1260 of each class numbers 1 and 7 are shown, according to an embodiment of the present disclosure. The representation table 1260 includes a class number, a level, and a sequence of representations for each class.

The content of the representation in the representation table 1260 may use a regular representation. If it is a regular representation, the initial character string 180 may be flexibly expressed in a question sentence or negative sentence. The content of the representation in FIG. 4 includes a conversion example in which the initial character string 180 becomes a question sentence by the regular representation.

The level corresponds to the level of representation, and if the level is larger, the representation is closer to that concept. For calculation of the level (Level), the maximum representation level is Max, the distance between the arbitrary point 195 touched by the user and the first region is R, the maximum distance between the outer edge of the first region and the outer edge of the second region is V. The level is calculated by the following formula.

$$\text{Level}=\text{Int}((\text{Max}-1)*(R/V))+1$$

In FIG. 1, the derivation indicator is "AGGRESSIVE" and the level 6 representation "Definitely!" Is selected.

Referring now to FIG. 5 an example of a class table is shown, according to an embodiment of the present disclosure. As illustrated in FIG. 5, the derivation indicator is managed by the class number, and the correspondence relationship is managed by the class table 1250 (FIG. 12). Further, each class is managed by a representation table 1260 having levels and representation contents as illustrated in FIGS. 3-4 above.

Figure 6:
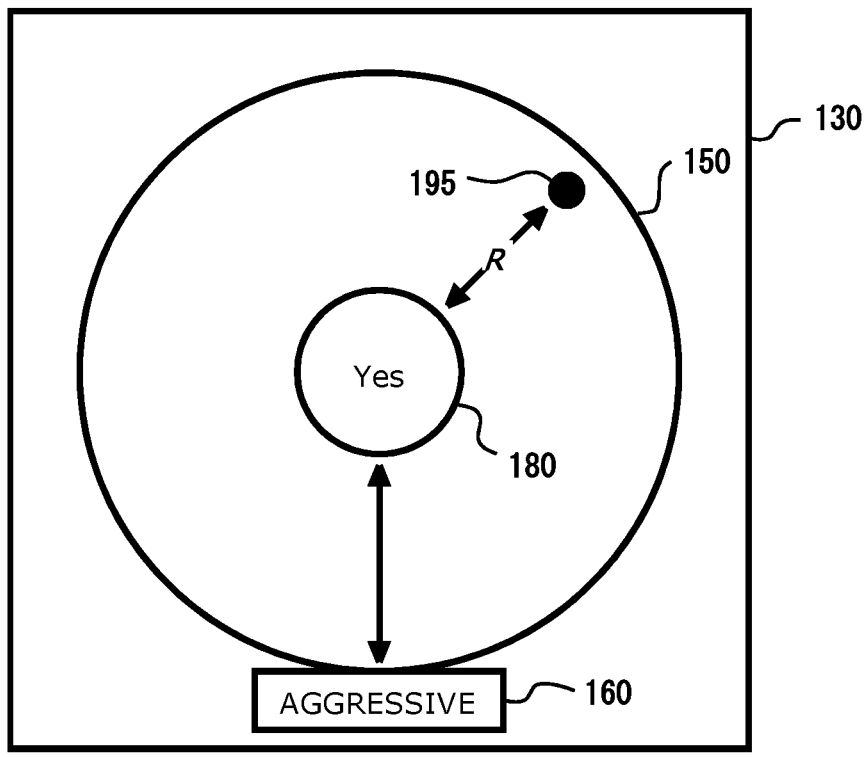
FIG. 6 illustrates a second example of character string generation, according to an embodiment of the present disclosure.

Referring now to FIG. 6, an example of character string generation is shown, according to another embodiment of the present disclosure. An initial character string 180 is arranged at the center of the window 130, and the region is defined as a first region. Further, a circle is provided with the first region as the center of the circle, and it is defined as the second region. When the user specifies an arbitrary point R outside the first region and inside the second region, the initial character string 180 is derived in accordance with the distance from the first region to the point R based on the derivation indicator 160.

Figure 7:
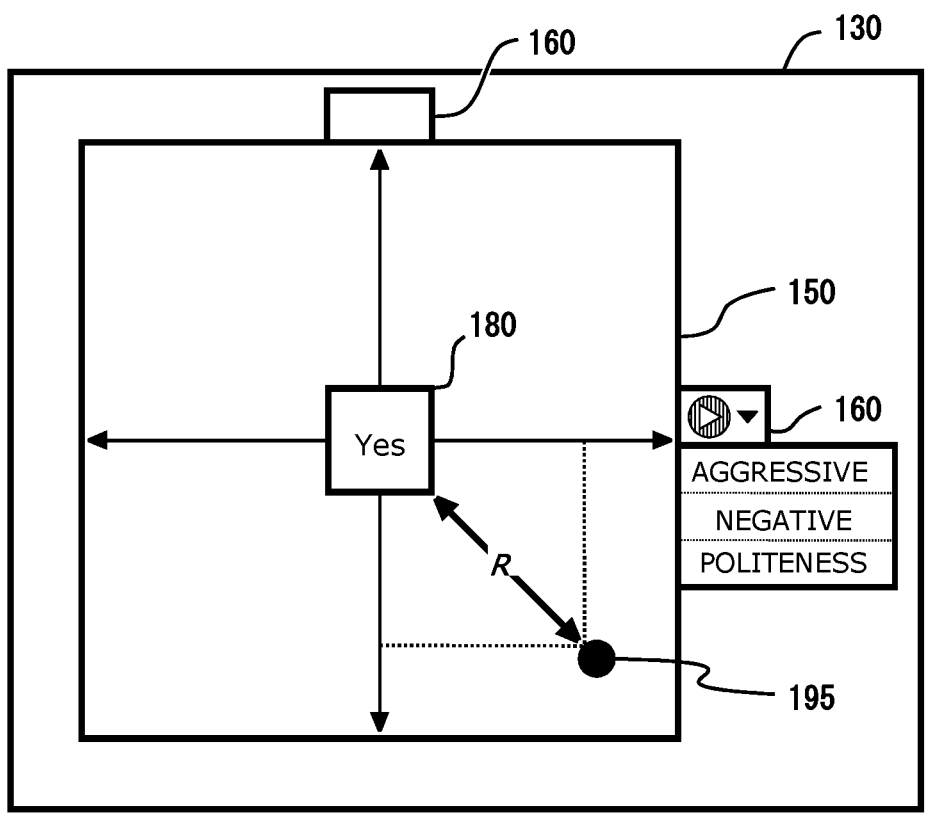
FIG. 7 illustrates a third example of character string generation, according to an embodiment of the present disclosure.

Referring now to FIG. 7 an example of character string generation is shown, according to another embodiment of the present disclosure. A rectangular initial character string (e.g., initial character string 180) is placed in the window 130, and the rectangular region is defined as a first region. Further, a two-dimensional plane area is provided so that the first region is defined as the plane origin, and this region is set as the second region. When the user designates an arbitrary point R outside the first region and inside the second region, the initial character string 180 is derived in accordance with the distance from the first region to the point R 160 based on the derivation indicator 160. It should be noted that derivation indicators 160 are prepared for each of the two dimensions in the case of FIG. 7. When the initial character string 180 is related to a plurality of derivation indicators 160, a character string generation window (e.g., window 150) of two or more dimensions is automatically provided. Further, by depressing the selection box of the derivation indicator 160, it is possible to select a desired derivation indicator.

Figure 8:
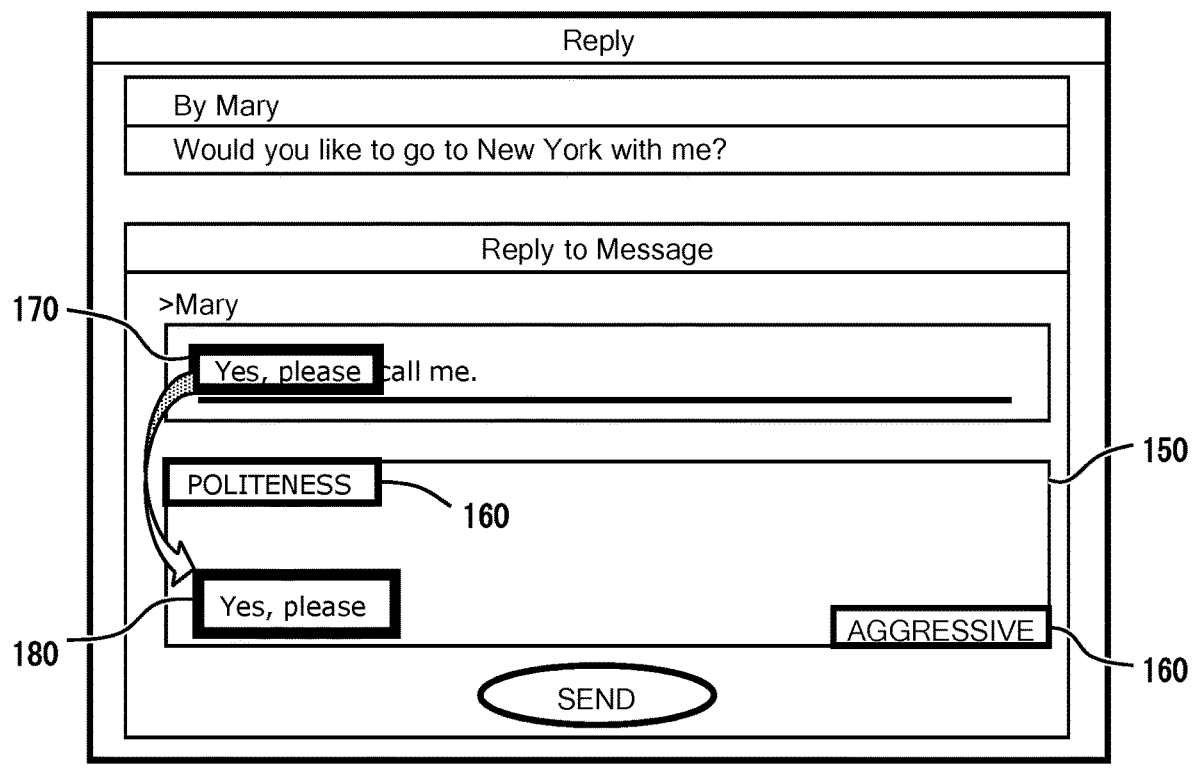
FIG. 8-10 illustrate an alternate example of character string generation, according to an embodiment of the present disclosure.
Figure 9:
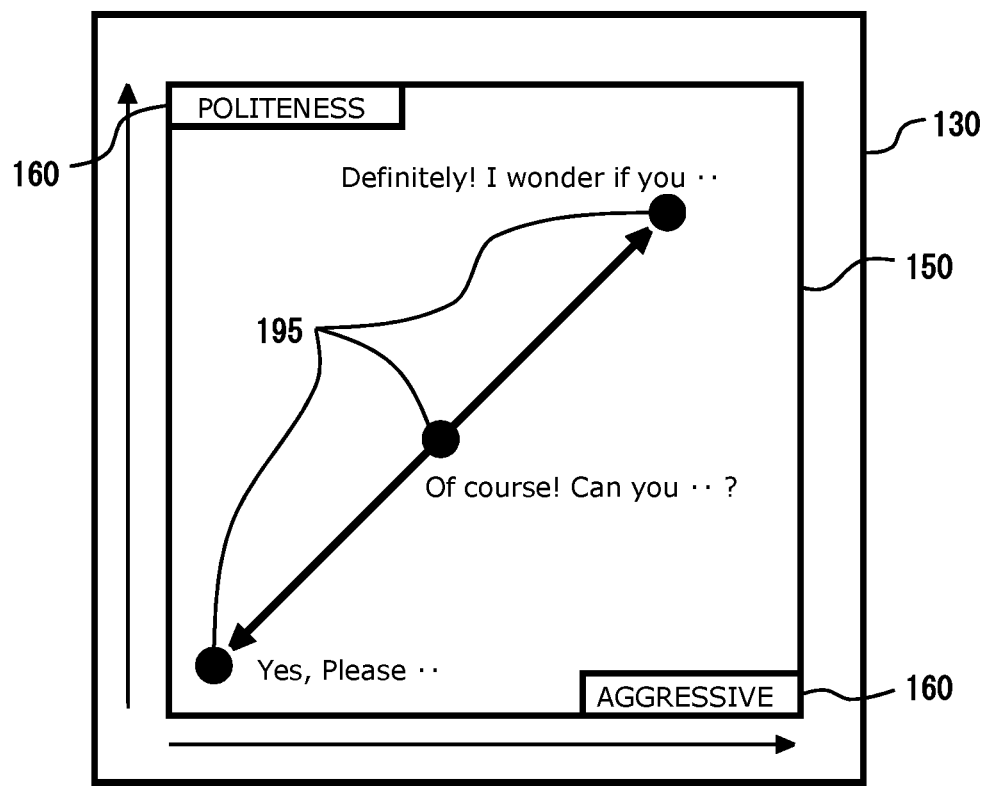
Figure 10:
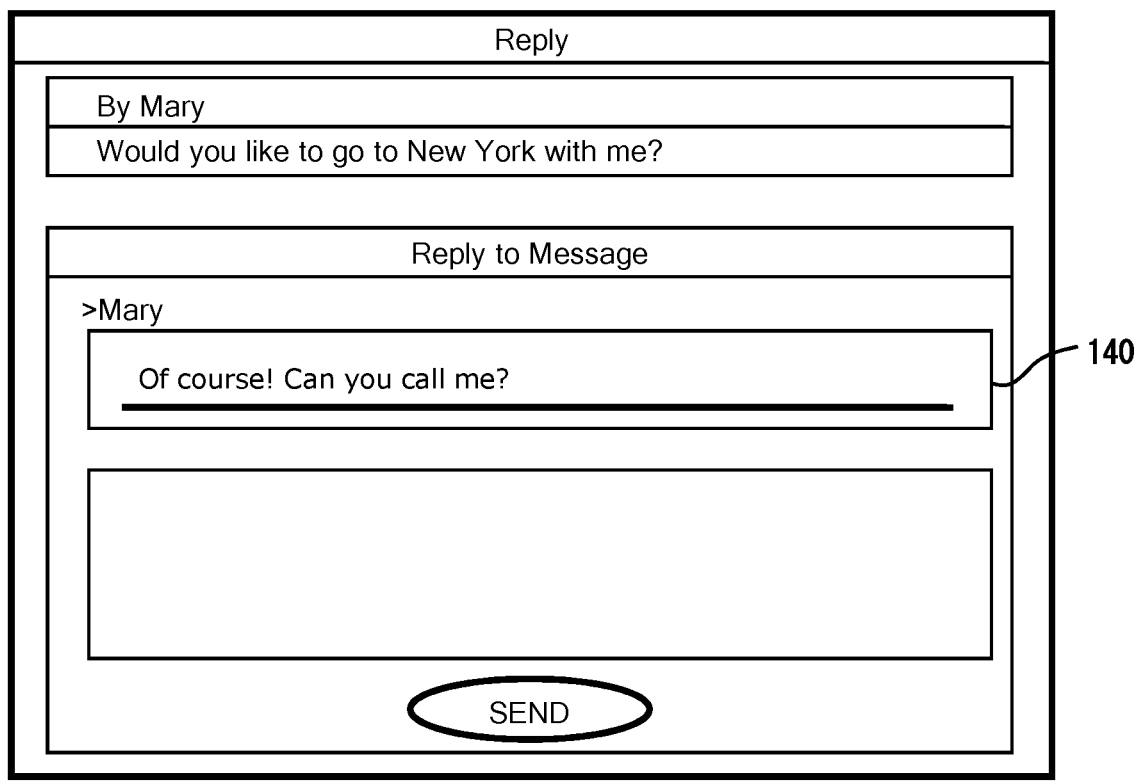

Referring now to FIGS. 8-10, an example of character string generation is shown, according to another embodiment of the present disclosure. More specifically, FIG. 8 shows an example in the case where the initial character string 180 is composed of a plurality of character strings and each has a derivation indicator 160. In FIG. 8, the user inputs "Yes, please call me.", as the reply character string 170 in the input field 190.

In a preferred aspect of the present invention, when it is determined that there are a plurality of character strings that may be derived in the input region, the character string generation window 150 to be capable of multi-dimension is automatically created. In the example of FIG. 8, the dimension in the horizontal direction is for deriving word "Yes", and the dimension in the vertical direction is for deriving word "Please".

The window 150 in FIG. 9 is an enlarged view of the window 150 in FIG. 8. In response to the user specifying an arbitrary point 195 in the window 150 and then moving the point within the plain of two dimensions, the character string "Yes, please" is multi-derived variously and dynamically as illustrated.

It should be noted that in the example of FIG. 9, the user may linearly move the finger, however, it may move it freely on a curve within the region 150.

When a finger is released at an arbitrary point 195 near the center of the window 150 in FIG. 9, a modified character string "Of course! Can you . . . ?" is finally determined. In a preferred embodiment, this modified character string is applied to the input character string of input field 190, therefore the input character string "Yes, please call me." is changed to "Of course! Can you call me?" and displayed on the window 140 as shown in FIG. 10.

Figure 11:
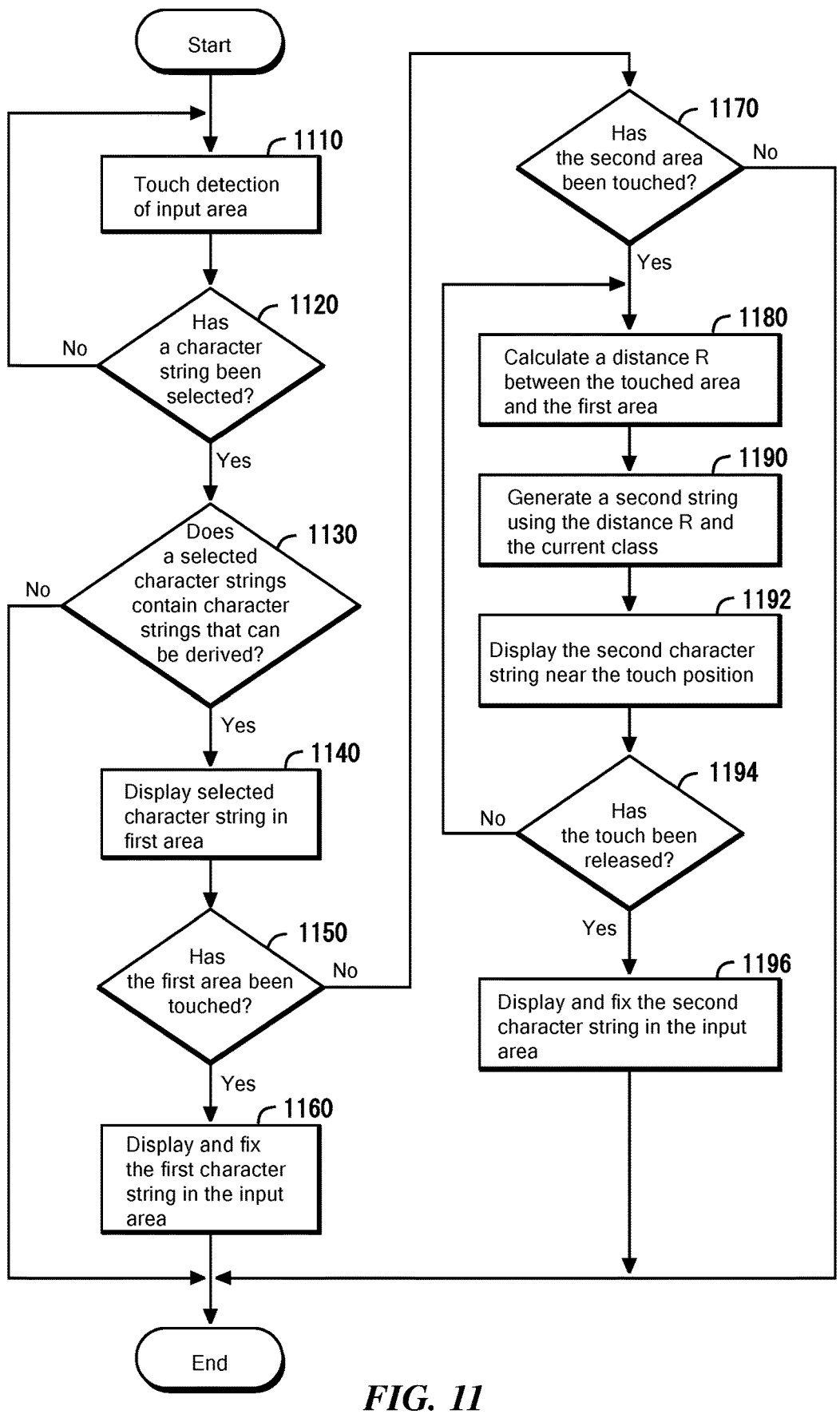
FIG. 11 shows an operation flowchart for generating character string, according to an embodiment of the present disclosure.

Referring now to FIG. 11, a flowchart describing the steps of the proposed method is shown, according to an embodiment of the present disclosure. In the following description, the method is based on a user-specified character string, however, it may also be based on a system-specified character string using search through the class DB.

In step 1110, touch of the input area is detected. In step 1120, it is determined whether a character string has been selected. If it is selected, in step 1130, it is determined whether or not a character string that may be derived is included in the character string selected. If it is not included, the process is terminated. If it is included, the process proceeds to step 1140.

In step 1140, the selected character string is displayed in the first region. Next, in step 1150, it is determined whether or not the first region is touched. If it is touched, no derivation is made and it is confirmed with the character string of the first region. If the first region is not touched in step 1150, the process proceeds to step 1170.

In step 1170, it is determined whether or not the second region is touched. If it is not touched, the process is terminated. If the second region is touched, the process proceeds to step 1180. Steps after step 1180 are the calculation processing which is the core process of the present invention. In step 1180, the distance R between the touched position and the first region is calculated.

Then, in step 1190, a second character string is generated using the distance R and the current class based on the derivation indicators (e.g., derivation indicators 160). Next, in step 1192, the second character string displayed near the touched position. In step 1194, it is determined whether the touch has been released, and if not, the process returns to 1180. If it is released, in step 1196, the second character string is finally displayed in the input field 190, and the process is terminated.

Referring now to FIG. 12 a detailed flowchart of the calculation process is shown, according to an embodiment of the present disclosure. First, in step 1210, the maximum level(Max) that may be derived at the current class is obtained from the class DB 1240. So, the level(Level) is calculated from the distance R.

Although the class DB 1240 is normally stored in the hard disk drive 2040 of FIG. 13, it may be placed on the cloud through the Internet. Further, a plurality of users may share the class DB 1240.

Next, in step 1220, the maximum length(V) of the straight line including the touch position is calculated with a straight line connecting the first region and the second region.

In step 1230, the ratio between the distance R from the first region to the touch position and the maximum length(V) is obtained, the maximum level(Max) is multiplied by the ratio to calculate the level(Level) to be derived. And the final derivation is obtained by using the level(L) as a key for referring to the table 1260.

For example, if an input character string (e.g., reply character string 170) is a home address, the derivation indicator 160 may be "ABSTRACT" and the address may be gradually refined. Consequently, a character string in which the address is detailed may be generated, the character string may include characters such as "USA"→"9800 USA"→"Seattle, Wash. 9800 USA"→.

In addition, when the input character string is the user movement information, the derivation indicator 160 may be "DETAILED" and the position may be gradually refined. Specifically, character strings such as "moving"→"walking"→"walking slowly"→"walking at 1.5 mph" . . . are generated. Likewise, it is possible to express the user's environment in various ways.

In this case, the movement information is obtained from the information terminal possessed by the user or the moving object being used. Depending on the touch position, the character string is derived from the most detailed user movement information to a simple one. In this embodiment, since the derived character string which details the user state is generated based on the current movement information, it is not necessary to refer to the class DB 1240.

Likewise, representations related to the user environment can be represented in different manners. It is also possible to respond, "I am driving now" automatically by acquiring user environment information against the question contents "What are you doing now?"

As another modified example, when the input character string is ranking information such as the world's highest temperature, the ranking candidate may be changed by "RANKING" (not shown) for the derivation indicator 160. Specifically, a ranking character string such as "55° C. Tye"→"55° C. Tunisia"→"56.7° C. Death Valley, America" are generated.

In this case, the ranking information is acquired from the keyword search through the Internet. Depending on the touch position, the character string to be derived is generated from the ranking upper to the lower order, and a character string is generated. In this embodiment, since the derived character string is generated based on the Internet information, it is not necessary to refer to the class DB 1240.

Therefore, embodiments of the present disclosure may provide a method, computer system and program product capable of setting a first region on a display, the first region including a first character string, setting a second region, the second region including the first region, and dynamically generating a second character string in response to a user specifying an arbitrary position outside the first region and within the second region, where generating the second character string includes changing a representation of the first character string based on a distance between the first region and the arbitrary position. According to embodiments of the present disclosure, the method further includes: in response to the first character string including a plurality of words whose level of representation can be changed, changing the representation of each word, and combining the plurality of words to generate the second character string, assigning a class indicator that indicates a concept for changing the representation, displaying the class name on the second region.

According to embodiments of the present disclosure, the method further includes: in response to the first character string having two classes, assigning each class to a different dimension of the second region, the class of the representation is "aggressive", "negative", "detailed", "abstract", "strength", "weakness", "politeness" or "rank".

According to an embodiment, in response to the first character string comprising an address as a class "abstract", generating the second character string by changing an abstraction level of the address, in response to the first character string comprising a number and a unit, as a class "rank", generating the second character string by changing a ranking representation level of the first character string, in response to the first character string comprising a location information, as a class "detail", generating the second character string by changing a level of detail corresponding to the location information, and in response to the first character string comprising a mobile information, as a class "detail", generating the second character string by changing a level of detail corresponding to the mobile information.

According to another embodiment, the method further includes determining the number of dimensions of the second region depending on the number of classes of the first character string.

Referring now to FIG. 13, an example of a hardware configuration for a computer 1900 is shown, according to an embodiment of the present disclosure. The computer 1900 according to an embodiment has a CPU periphery part with a CPU 2000, RAM 2020, graphic controller 2075, and display device 2080, mutually connected by a host controller 2082, and input output part with a communication interface 2030, hard disk drive 2040, and DVD drive 2060, connected to the host controller 2082 by an I/O controller 2084, and a legacy input output part with ROM 2010, flexible disk drive 2050, and I/O chip 2070 connected to the I/O controller 2084.

The host controller 2082 connects the RAM 2020, the CPU 2000 that accesses the RAM 2020 at a high transfer rate, and the graphic controller 2075. The CPU 2000 operates and controls the various parts based on a program that is stored in the ROM 2010 and the RAM 2020. The graphic controller 2075 acquires image data generated in a frame buffer provided in the RAM 2020 and displays the image on the display device 2080. Alternatively, the graphic controller 2075 may internally include a frame buffer that stores image data to be reproduced by the CPU 2000 or the like.

The I/O controller 2084 connects the host controller 2082, the communication interface 2030 which is a relatively high-speed input output device, the hard disk drive 2040, and the DVD drive 2060. The communication interface 2030 communicates with other devices through a network. The hard disk drive 2040 stores data and programs to be used by the CPU 2000 in the computer 1900. The DVD drive 2060 reads data or programs from a DVD-ROM 2095 and provides the data or program to the hard disk drive 2040 via the RAM 2020.

Furthermore, the I/O controller 2084 is connected to the ROM 2010, flexible disk drive 2050, and an input output device with a relatively low-speed I/O chip 2070. The ROM 2010 stores a boot program that is executed when starting the computer 1900, and/or programs or the like that depend on the hardware of the computer 1900. The flexible disk drive 2050 reads the program or data from a flexible disk 2090, and provides the program or data to the hard disk drive 2040 via the RAM 2020.

The I/O chip 2070 connects the touch position detecting part 2081 and the flexible disk drive 2050 to the I/O controller 2084, and also connects various types of input output devices to the I/O controller 2084 via a parallel port, serial port, keyboard port, mouse port, or the like. Herein, if an acceleration detector that detects acceleration is used as the input output device, the I/O chip 2070 is connected to the acceleration detecting part, and the acceleration detecting part is connected to the I/O controller 2084.

The program provided to the hard disk drive 2040 via the RAM 2020 is provided by a user and stored on a recording medium such as a flexible disk 2090, DVD-ROM 2095, or IC card or the like. The program is read from the recording medium, installed into the hard disk drive 2040 in the computer 1900 via the RAM 2020, and executed in the CPU 2000.

The program is installed in the computer 1900, and the computer 1900 functions as the system of the present invention. In an embodiment, the touch panel (window 110) is the display device 2080 with a touch position detecting part 2081 such as a touch sensor or the like. The touch position detecting part 2081 is connected to an I/O chip 2070.

Text input processing described in the program functions which is a specific means that collaborates with the software and the various types of hardware resources, by being read by the computer 1900.

As an example, when communication is performed between the computer 1900 and an external device or the like, the CPU 2000 executes a communication program loaded onto the RAM 2020, and communication processing instructions are provided to the communication interface 2030 based on the processing details recorded in the communication program.

The communication interface 2030 is controlled by the CPU 2000, reads transmission data stored in the transfer buffer region or the like provided on a storage device such as the RAM 2020, hard disk drive 2040, flexible disk 2090, or DVD-ROM 2095 and transmits to a network, or writes the reception data received from the network to a reception buffer region or the like provided on the storage device. In this manner, the communication interface 2030 can transfer transmission data to a memory device using a DMA (direct memory access) method, or alternatively, the CPU 2000 reads data from the communication interface or the memory device transmission source and then forwards the transmission data by writing the data to the storage device or to the communication interface 2030 of the forwarding destination.

Furthermore, the CPU 2000 reads all or the necessary parts of the file or database or the like stored in an external storage device such as a hard disk drive 2040, DVD drive 2060 (DVD-ROM 2095), flexible disk drive 2050 (flexible disk 2090) and the like, on to the RAM 2020 using DMA transfer or the like, and performs various types of processes on the data on the RAM 2020.

Furthermore, the CPU 2000 writes back the processed data to the external storage device using DMA transfer or the like. During this type of processing, the RAM 2020 temporarily holds the content of an external storage device, and therefore with the embodiment, the RAM 2020 and the external storage device and the like are generally referred to as memory, memory part, or memory device or the like. The various types of information such as the various programs, data, tables, databases, and the like in the embodiments are stored in this type of memory device, and are subject to text input processing.

Note, the CPU 2000 maintains a portion of the RAM 2020 on the cache memory, and can perform reading and writing onto the cache memory. Under this condition, the cache memory performs a part of the function of the RAM 2020, so in the embodiments of the present invention, unless otherwise expressly distinguished, the cache memory is included by the RAM 2020, memory, and/or memory device.

Furthermore, the CPU 2000 performs various types of processes including the various types of calculations, text input processing, condition determination, information searching and replacing, and the like that are included in the embodiment the present invention and specified by a command sequence of a program with regards to the data that was read from the RAM 2020, and the CPU 2000 also writes back to RAM 2020.

For example, when determining conditions, the CPU 2000 compares various types of variables described in the embodiments to other variables or constants, and determines whether conditions such as greater, less, greater or equal, less or equal, or equal to, or the like are satisfied, and if the conditions are satisfied or if not satisfied, the CPU 2000 branches to a different command string or calls out a subroutine.

Further, the CPU 2000 can retrieve information stored in the class DB 1240 in the memory device. For example, it is possible to read the class name corresponding to the class number from the class table 1250. Likewise, from the representation table 1260, its representation content (derived strings) can be read from the designated class number and the level.

The aforementioned programs or modules can also be stored on an external recording medium. The recording medium can be a flexible disk 2090, DVD-ROM 2095, as well as an optical recording medium such as a DVD or CD or the like, optical magnetic recording medium such as MO, tape medium, semiconductor memory such as an IC card, or the like.

Furthermore, a memory device such as a hard disk or RAM provided on a server system that is connected to a dedicated communication network or the Internet can be used as the recording medium, and the program can be provided to the computer 1900 through the network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium 2095, 2090 can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD) 2095, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
identifying, by a computer, a first region within a window displayed on a touch panel of the computer, wherein the first region comprises a first area within the window for displaying a first character string;
identifying, by the computer, a second region within the window, the second region comprises a second area within the window excluding the first region, wherein an inner edge of the second region is a perimeter of the first region and an outer edge of the second region is an outer frame of the window;
receiving, from a user of the computer, a selection of a point within the second region via a touch gesture, the point comprising a touch position within the second region;
in response to receiving the selection of the point within the second region, calculating, by the computer, a distance between the first region and the touch position;
based on the calculated distance, automatically displaying, by the computer, a derivation indicator indicating a second representation of the first character string according to a concept, the derivation indicator is displayed near the touch position, wherein the derivation indicator is selected based on a class indicator; and
based on a selection of the derivation indicator, dynamically generating, by the computer, a second character string comprising the second representation of the first character string, wherein the second character string replaces the first character string.

2. The method according to claim 1, further comprising:
in response to the first character string comprising a plurality of words whose level of representation can be changed, changing a representation of each word; and
combining the plurality of words to generate the second character string.

3. The method according to claim 1, further comprising:
assigning the class indicator that indicates the concept for changing the first representation into the second representation of the first character string according to a class table, wherein each class in the class table is managed by a representation table comprising levels and representation contents; and
assigning the derivation indicator based on the concept, wherein the derivation indicator is automatically displayed to the user in the form of a selection box.

4. The method according to claim 3, further comprising:
displaying a class name on the second region.

5. The method according to claim 3, further comprising:
in response to the first character string having two classes, assigning each class to a different dimension of the second region.

6. The method according to claim 3, wherein the class of the representation is "aggressive", "negative", "detailed", "abstract", "strength", "weakness", "politeness" or "rank".

7. The method according to claim 6, further comprising:
in response to the first character string comprising an address as a class "abstract", generating the second character string by changing an abstraction level of the address.

8. The method according to claim 6, further comprising:
in response to the first character string comprising a number and a unit, as a class "rank", generating the second character string by changing a ranking representation level of the first character string.

9. The method according to claim 6, further comprising:
in response to the first character string comprising a location information, as a class "detail", generating the second character string by changing a level of detail corresponding to the location information.

10. The method according to claim 6, further comprising:
in response to the first character string comprising a mobile information, as a class "detail", generating the second character string by changing a level of detail corresponding to the mobile information.

11. The method according to claim 1, further comprising:
determining a number of dimensions of the second region depending on a number of classes of the first character string.

12. A computer system comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
identifying, by a computer, a first region within a window displayed on a touch panel of the computer, wherein the first region comprises a first area within the window for displaying a first character string;
identifying, by the computer, a second region within the window, the second region comprises a second area within the window excluding the first region, wherein an inner edge of the second region is a perimeter of the first region and an outer edge of the second region is an outer frame of the window;
receiving, from a user of the computer, a selection of a point within the second region via a touch gesture, the point comprising a touch position within the second region;
in response to receiving the selection of the point within the second region, calculating, by the computer, a distance between the first region and the touch position;
based on the calculated distance, automatically displaying, by the computer, a derivation indicator indicating a second representation of the first character string according to a concept, the derivation indicator is displayed near the touch position, wherein the derivation indicator is selected based on a class indicator; and
based on a selection of the derivation indicator, dynamically generating, by the computer, a second character string comprising the second representation of the first character string, wherein the second character string replaces the first character string.

13. The computer system according to claim 12, further comprising:
in response to the first character string comprising a plurality of words whose level of representation can be changed, changing a representation of each word; and
combining the plurality of words to generate the second character string.

14. The computer system according to claim 12, further comprising:
assigning the class indicator that indicates the concept for changing the first representation into the second representation of the first character string according to a class table, wherein each class in the class table is managed by a representation table comprising levels and representation contents; and
assigning the derivation indicator based on the concept, wherein the derivation indicator is automatically displayed to the user in the form of a selection box.

15. The computer system according to claim 14, further comprising:
displaying a class name on the second region.

16. The computer system according to claim 14, further comprising:
in response to the first character string having two classes, assigning each class to a different dimension of the second region.

17. The computer system according to claim 14, wherein the class of the representation is "aggressive", "negative", "detailed", "abstract", "strength", "weaknes s", "politeness" or "rank".

18. The computer system according to claim 17, further comprising:
in response to the first character string comprising an address, as a class "abstract", generating the second character string by changing an abstraction level of the address.

19. The computer system according to claim 17, further comprising:
in response to the first character string comprising a number and a unit, as a class "rank", generating the second character string by changing a ranking representation level of the first character string.

20. The computer system according to claim 17, further comprising:
in response to the first character string comprising a location information, as a class "detail", generating the second character string by changing a level of detail corresponding to the location information.

* * * * *